United States Patent [19]

Eisele et al.

[11] 4,294,209
[45] Oct. 13, 1981

[54] INTERNAL COMBUSTION ENGINE

[75] Inventors: Erwin Eisele, Stuttgart; Hans-Peter Charzinski, Waiblingen; Klaus Binder, Deizisau, all of Fed. Rep. of Germany

[73] Assignee: Daimler-Benz Aktiengesellschaft, Fed. Rep. of Germany

[21] Appl. No.: 30,545

[22] Filed: Apr. 16, 1979

Related U.S. Application Data

[63] Continuation of Ser. No. 901,772, Aug. 18, 1976, abandoned, which is a continuation of Ser. No. 715,540, Aug. 18, 1976, abandoned.

[51] Int. Cl.$^3$ .............................................. F02B 3/00
[52] U.S. Cl. .................................... 123/293; 123/269; 123/273
[58] Field of Search ............ 123/32 ST, 32 D, 32 SP, 123/32 C, 32 L, 32 K, 191 SP

[56] References Cited

U.S. PATENT DOCUMENTS

| | | | |
|---|---|---|---|
| 2,243,846 | 6/1941 | Hofseher | 123/32 K |
| 2,741,229 | 4/1956 | Stump | 123/32 C |
| 2,766,738 | 10/1956 | Hoffman | 123/32 C |
| 2,804,858 | 9/1957 | Schilling | 123/32 C |
| 3,220,389 | 11/1965 | Van Rinsum | 123/32 C |
| 3,872,841 | 4/1975 | Kimbarra | 123/32 ST |
| 3,878,826 | 4/1975 | Date | 123/32 ST |
| 3,890,940 | 6/1975 | List | 123/32 C |

FOREIGN PATENT DOCUMENTS

| | | | |
|---|---|---|---|
| 536634 | 10/1931 | Fed. Rep. of Germany | 123/32 K |
| 694124 | 6/1940 | Fed. Rep. of Germany | 123/32 K |
| 1020483 | 12/1957 | Fed. Rep. of Germany | 123/32 K |
| 704198 | 2/1950 | United Kingdom | 123/32 K |

Primary Examiner—Ronald B. Cox
Attorney, Agent, or Firm—Craig and Antonelli

[57] ABSTRACT

An internal combustion engine operating with self-ignition which is equipped with a main combustion space including a piston recess and with an auxiliary chamber arranged in the cylinder head an injection nozzle is coordinated to the auxiliary chamber while the chamber includes an insert forming an overflow channel provided with several discharge holes terminating in the main combustion space. The discharge holes are matched as regards their direction and cross section to the main combustion space-air volume component to be seized or impinged upon by the respective jet passing through the corresponding discharge hole. The discharge holes are thereby proportional in cross section to the main combustion space-air volume component located in front thereof when the piston is in a position corresponding to the center point of the full-load heat-release curve and are directed toward the center of gravity of the respective main combustion space-air volume component.

10 Claims, 4 Drawing Figures

INTERNAL COMBUSTION ENGINE

This is a continuation of application Ser. No. 901,772, Aug. 18, 1976 which is a continuation of application Ser. No. 715,540, filed Aug. 18, 1976, both now abandoned.

The present invention relates to an internal combustion engine, especially to an internal combustion engine operating with auto-ignition, with a main combustion space including a piston trough or recess and with an auxiliary chamber arranged in the cylinder head, to which is coordinated an injection nozzle and which is provided with combustion or discharge openings discharging in the direction toward the main combustion space, which openings, as regards their direction and cross section, are matched to the main combustion space-air volume components to be seized or impinged upon by the respective combustion gas jet.

In a prior art engine of this type (German Pat. No. 694,124), a matching and alignment of the combustion or discharge openings to the main combustion space-air volume component to be respectively seized or impinged upon is provided; however, nothing is stated in this prior art patent, as to which main combustion space-air volume component is involved, so that the optimizing could be achieved, if at all, only accidentally and, accordingly, has not been realized in practice.

An internal combustion engine of the aforementioned type is to be further developed by the present invention to the effect that the air volume of the main combustion space to be impinged upon can be intentionally and consciously improved in a desired manner.

According to the present invention, this is achieved by making the combustion or discharge openings proportional in cross section to the main combustion space-air volume component respectively disposed in front thereof, when the piston is in a piston position corresponding to the center point of the full-load heat release curve and by having the combustion or discharge openings aligned with the center of gravity of this combustion space-air volume component. From this construction, not only practically identical fuel-air-ratio conditions will result for the individual main combustion space sectors, but these main combustion space-air volume components are also optimally impinged upon so that a very uniform combustion of the entire main combustion space-air volume is assured and a favorable fuel consumption is attained.

In one embodiment of the present invention, the combustion or discharge holes are located corresponding to the location of the center point of the area of the full-load heat-release curve on a cone with an angle of about 155° to about 175° whereby the center point of the heat conversion, i.e., of the heat-release curve, lies at full-load within the area of about 17° to about 26° after the piston top dead-center position.

Within the indicated limits there exists thereby the tendency that, corresponding to the advance of the heat-release center point which results with an increasing volume proportion of the pre-chamber, the center angle of the cone, on which are located the combustion or discharge holes, becomes larger. Also the increasing number of the combustion openings will tendentiously have the same effect.

Accordingly, it is an object of the present invention to provide an internal combustion engine of the aforementioned type which avoids by simple means the above-mentioned shortcomings and drawbacks encountered in the prior art.

Another object of the present invention resides in an internal combustion engine, in which an optimization can be readily achieved in practice as regards the matching and alignment of the combustion openings to the main combustion space-air volume component to be respectively seized or impinged upon thereby.

A further object of the present invention resides in an internal combustion engine which assures a very uniform and complete combustion of the entire main combustion space-air volume.

Still a further object of the present invention resides in an internal combustion engine of the type described above which enables favorable fuel consumption.

These and other objects, features and advantages of the present invention will become more apparent from the following description when taken in connection with the accompanying drawing which shows, for purposes of illustration only, two embodiments in accordance with the present invention, and wherein.

Figure 1:
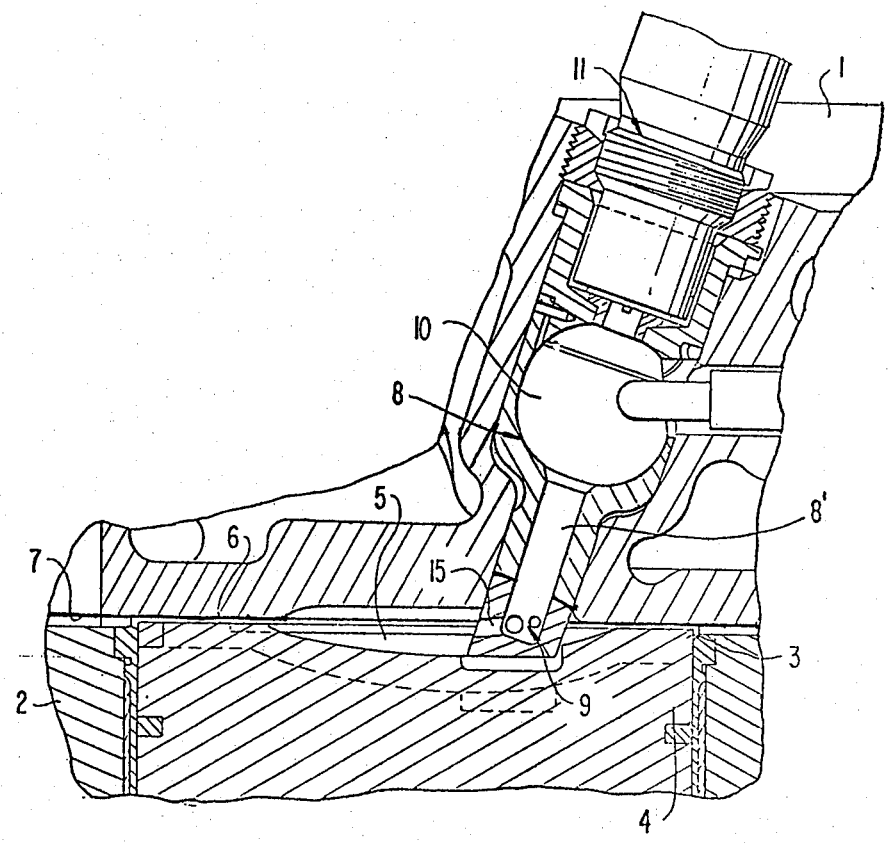
FIG. 1 is a schematic partial axial cross-sectional view through the cylinder head area of an internal combustion engine in accordance with of a first embodiment of the present invention, taken along line I—I of FIG. 2.

Referring now to the drawing wherein like reference numerals are used throughout the two views to designate like parts, in the drawings which are far-reachingly schematic views, reference numeral 1 designates the cylinder head and reference numeral 2 the cylinder block, in which is provided a cylinder bore 3 that receives the piston 4. The piston 4 is provided approximately centrally thereof with a relatively flat, spherically shaped or cup-shaped piston trough or recess 5 which intersects the flat piston top 6 near the piston edge whereby the piston top 6 in the upper dead-center position of the piston 4, illustrated in FIG. 1 in full lines, has as small a spacing separating it from the cylinder-head bottom 7 as possible.

The overflow channel 8′, formed by an insert member generally designated by reference numeral 8, which is coordinated in the instant embodiment to the auxiliary chamber 10 and, as also formed at least in part by the insert member 8, projects below the cylinder head bottom 7 and is in communication with the piston recess 5 of the main combustion space by way of a number of burner holes 15–19 provided in the multi-hole burner section 9 of the insert member 8. An injection nozzle 11 is arranged in the auxiliary chamber 10 opposite the overflow channel 8′.

The multi-hole burner 9, by way of which the overflow channel 8 discharges into the main combustion space, is located preferably as centrally as possible, insofar as the inlet and exhaust elements are concerned, not illustrated herein to, permit the same. In the illustrated embodiment, the multi-hole burner 9 includes approximately radially extending burner holes 15-19. The latter are so arranged that the jets passing through the respective discharge openings are disposed on a cone, having normally an angle between about 155° to about 175°. The magnitude of this angle is determined according to the present invention in dependence on the position of the center point of the full-load heat-release curve (FIG. 3) of the internal combustion engine which customarily lies within the area of about 17° to about 26° after the crank shaft angle passes the top dead-center position of the piston. Consequently, a well-defined piston position corresponds to the aforementioned center point, which is indicated in FIG. 1 in dash lines and which will be explained more fully by reference to FIG. 3. The discharge openings and the discharge opening jets are thereby directed to and aligned with the center of gravity of the main combustion space air volume component disposed in front of a respective discharge bore and to be respectively seized or impinged upon, in this piston position.

Figure 2:
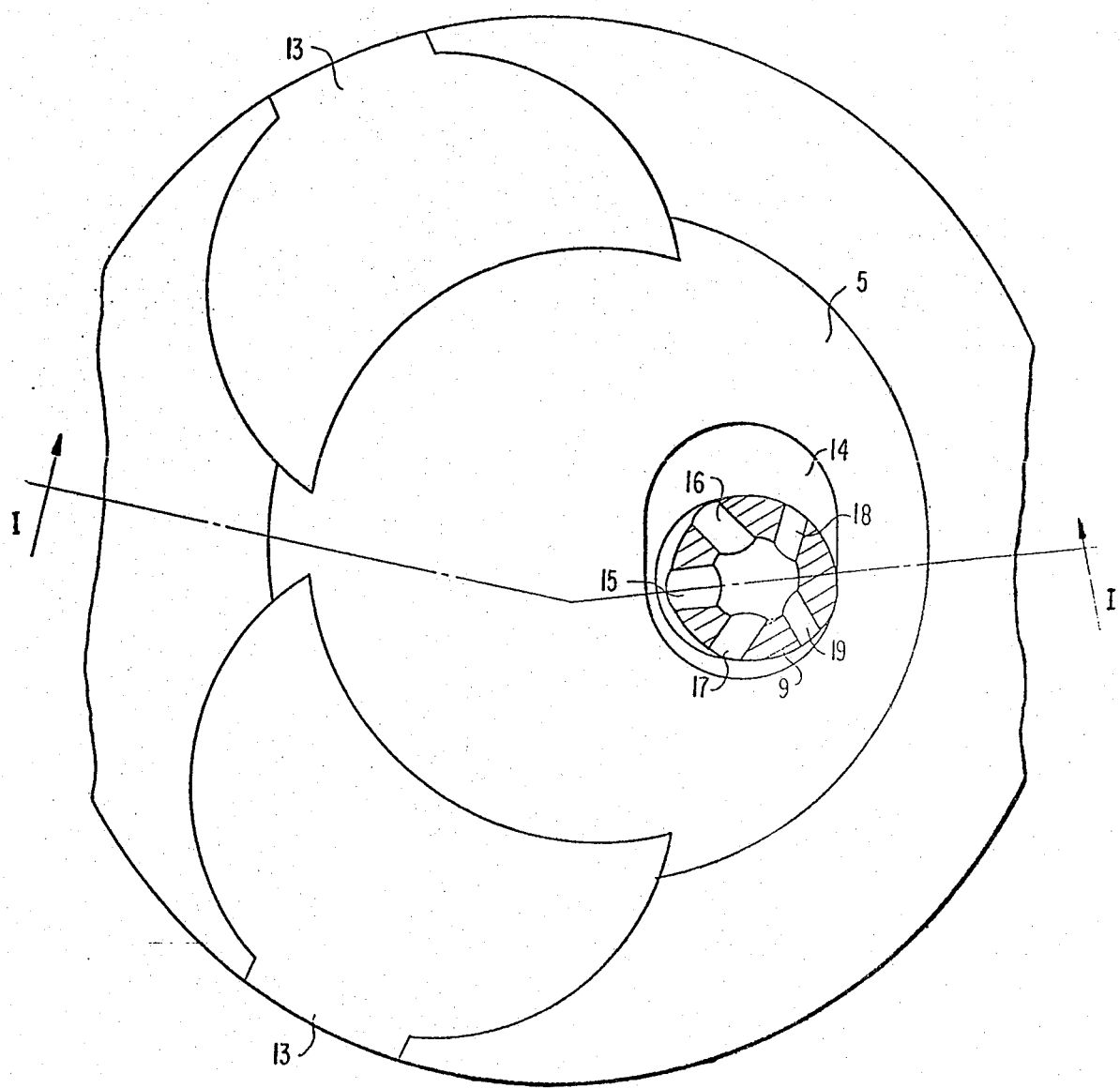
FIG. 2 is a plan view, on an enlarged scale, of the piston of the internal combustion engine according to FIG. 1 in conjunction with a cross section through the burner of the auxiliary chamber at the height of the discharge openings.

FIG. 2 illustrates, in addition to the piston recess 5 in addition, to the valve apertures 13 provided in the piston top, and in addition to a separate piston recess 14 disposed inside of the piston recess 5 and coordinated to the multi-hole burner 9, that the combustion openings 15 to 19 are matched in their cross section to the volume of the main combustion space-air volume component to be seized respectively impinged upon in the piston position corresponding to the center point of the heat-release curve. The burner opening 15 with the largest cross section is thereby coordinated to the largest main combustion space-air volume sector or component by reason of the eccentric position of the insert member 8 and therewith of the discharge of the auxiliary chamber 10 formed by the multi-hole burner 9, whereas correspondingly smaller burner openings 18 and 19 are coordinated to the correspondingly smaller, oppositely disposed main combustion space-air sectors or components which are correspondingly smaller by reason of the smaller distance of the burner section 9 to the edge of the piston recess 5.

Altogether, an arrangement results thereby in the construction according to the present invention, in which the discharge opening with the largest cross section is located on the bisector of the angle determined by the two adjacent discharge openings 16 and 17, which, in the illustrated embodiment, has a magnitude of about 90° to about 100°. The two further discharge openings 18 and 19 are arranged approximately symmetrically to the aforementioned angle bisecting line, but with an opposite direction of extension, which openings subtend an angle of about 120° to about 130°. An altogether uniform seizure or impingement of the main combustion space-air volume results therefrom.

Figure 4:
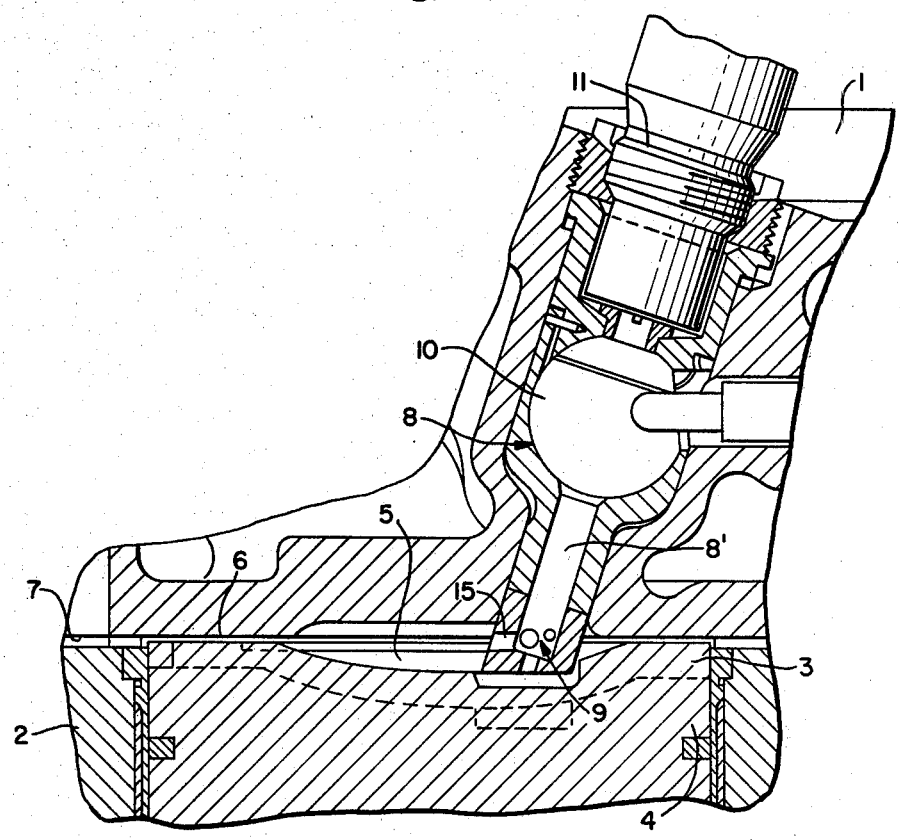
FIG. 4 is a schematic partial axial cross sectional view through a cylinder head area of an internal combustion engine in accordance with a second embodiment of the present invention.

In addition to the construction illustrated in the drawings, the burner section 9, as shown in FIG. 4, may additionally be provided according to the present invention in its area facing the piston top 6 with a bottom aperture, through which the seizure or impingement of the main combustion space-air volume is assured also within the area underneath the burner section 9.

Figure 3:
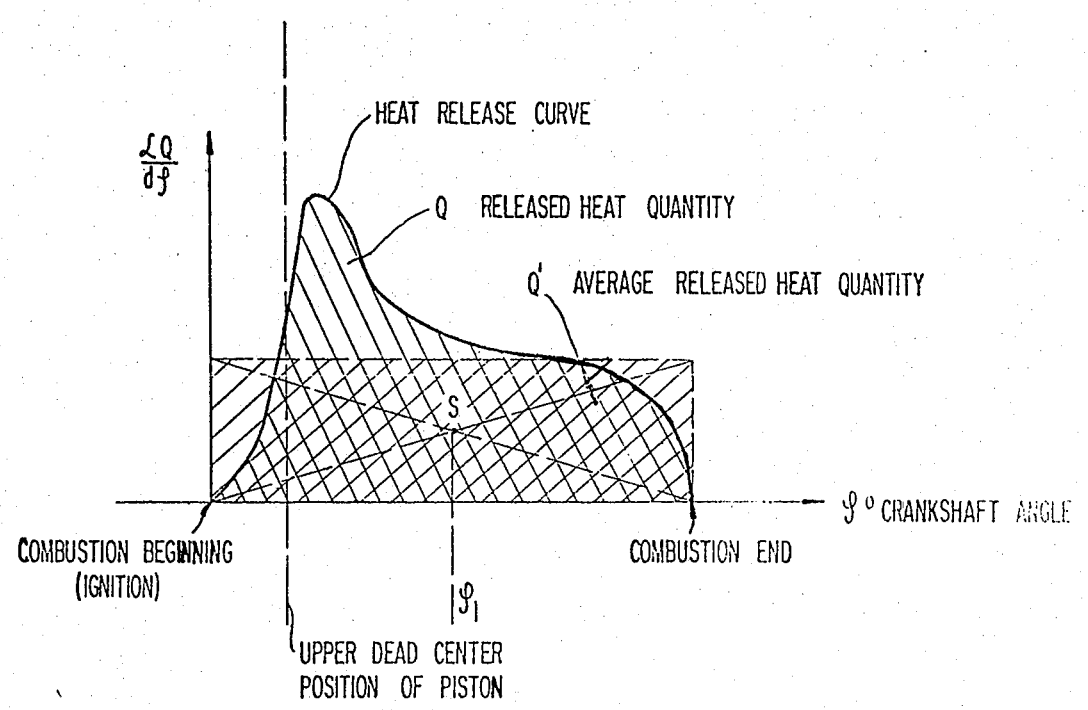
FIG. 3 is a diagram showing the heat release curve in which heat release $(dQ/d\phi)$ is plotted against crank angle $\phi$.

To facilitate an understanding of the present invention, reference is made to the heat-release curve shown in FIG. 3, it being noted that the heat-release curve is normally plotted against crankshaft angle. The heat release normally commences with the ignition, which represents the beginning of the combustion, and terminates with the combustion end. The maximum of the heat release occurs near the upper dead-center position of the piston (OT), the so-called ignition dead-center position. For purposes of determining the center point of heat-release curve, the released heat quantity Q is determined from the area below the heat-release curve. This heat quantity Q corresponds in its amount to the average released heat quantity Q' which is represented as a rectangular area under an average curve of the heat-release curve which can be drawn in as a rectangle between the combustion beginning and the combustion end.

Based on this average released heat quantity Q', i.e., based on the rectangular surface corresponding thereto, the center point of the heat release curve is determined by the center point of this area Q', whereby the center point is designated in FIG. 3 by reference character S. A crank angle $\phi_1$ corresponds to this center point S, whereby the space-air, above the piston 4 in this piston position corresponding to the crank angle $\phi_1$ and shown in dash lines in FIG. 1, represents the main combustion space-air volume in the piston position corresponding to the center point of the full-load heat-release curve. FIG. 3 illustrates a typical heat-release curve, though this curve may, of course, vary from one to another type of engine. However, this poses no problem since the heat-release curve can be determined for each engine without great difficulty and thus the center point of the full-load heat-release curve and therewith the angle $\phi_1$ will be readily available in each case.

The matching and alignment of the discharge or combustion openings are matched to the main combustion space-air volume components to be seized or impinged upon, respectively. Namely, the discharge or combustion openings are respectively proportional in cross section to the main combustion space-air volume component. Also, the discharge or combustion are respectively directed toward the center of gravity of the main combustion space-air volume component. The main combustion space-air component is the volume disposed in front of and to be seized or impinged upon a jet passing through the respective discharge or combustion opening when a piston position corresponds to a center point of the full-load heat-release curve, preferably, when the piston position is at a piston crank angle of about 17° to about 26° after the piston top dead-center position.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What I claim is:

1. An internal combustion engine comprising a plurality of pistons disposed in cylinders, a cylinder head, a main combustion space means, recess means provided in the respective pistons for forming at least a part of the main combustion space means, an auxiliary chamber means eccentrically provided in the cylinder head, and an injection nozzle means operatively associated with the auxiliary chamber means, several discharge openings provided in said auxiliary chamber means for discharging into the main combustion space means, the direction and cross section of the discharge openings being matched to a main combustion space-air volume component of a main combustion space-air volume to be impinged upon by a jet passing through the respective discharge openings, characterized in that the discharge openings have a cross section which is substantially proportional to the main combustion space-air volume component of the main combustion space-air volume disposed in front of and impinged upon by a jet passing through the respective discharge openings when the piston is at a position having a crankshaft angle corresponding to a center point of an area under a full-load heat-release curve for the combustion process, and in that the discharge openings are substantially directed toward a center of gravity of the respective main combustion space-air volume component of the main combustion space-air volume.

2. An internal combustion engine according to claim 1, characterized in that the discharge openings are disposed on a cone with a center angle of about 155° to about 175°.

3. An internal combustion engine according to claim 2, characterized in that the crank angle of the piston is located at full-load within the area of about 17° to about 26° after upper dead-center position of the piston.

4. An internal combustion engine according to claim 3, characterized in that at least one further discharge opening is provided which is directed toward the top of the piston.

5. An internal combustion engine according to claim 4, characterized in that the engine operates with auto-ignition.

6. An internal combustion engine according to claim 1, characterized in that the crank angle of the piston is located at full-load within the area of about 17° to about 26° after upper dead-center position of the piston.

7. An internal combustion engine according to claim 1, characterized in that at least one further discharge opening is provided which is directed toward the top of the piston.

8. An internal combustion engine according to claim 7, characterized in that the crank angle of the piston is located at full-load within the area of about 17° to about 26° after upper dead-center position of the piston.

9. An internal combustion engine according to claim 1, characterized in that the engine operates with auto-ignition.

10. An internal combustion engine according to one of claims 1, 2, or 3, characterized in that the discharge opening having the largest cross section is located on a bi-sector of an angle determined by two adjacent discharge openings, said angle has a magnitude of between 90° to about 100°, and in that at least two further discharge openings are arranged approximately symmetrically to said bi-sector to form a second angle with an opposite direction of extension, said angle having a magnitude of about 120° to about 130°.

* * * * *